United States Patent
Hashimoto et al.

(10) Patent No.: US 10,020,511 B2
(45) Date of Patent: Jul. 10, 2018

(54) LITHIUM SECONDARY BATTERY

(75) Inventors: Tatsuya Hashimoto, Osaka (JP);
Keisuke Ohara, Osaka (JP); Yuji Yokoyama, Moriguchi (JP); Yusuke Fukumoto, Toyonaka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 421 days.

(21) Appl. No.: 14/426,799

(22) PCT Filed: Sep. 10, 2012

(86) PCT No.: PCT/JP2012/073100
§ 371 (c)(1),
(2), (4) Date: Apr. 13, 2015

(87) PCT Pub. No.: WO2014/038092
PCT Pub. Date: Mar. 13, 2014

(65) Prior Publication Data
US 2015/0221951 A1    Aug. 6, 2015

(51) Int. Cl.
*H01M 4/62* (2006.01)
*H01M 10/052* (2010.01)
(Continued)

(52) U.S. Cl.
CPC .............. *H01M 4/62* (2013.01); *H01M 4/13* (2013.01); *H01M 4/621* (2013.01);
(Continued)

(58) Field of Classification Search
CPC .......... H01M 4/62; H01M 4/13; H01M 4/621; H01M 4/139; H01M 4/622; H01M 10/052; H01M 2220/20
See application file for complete search history.

(56) References Cited

U.S. PATENT DOCUMENTS

| | | | | |
|---|---|---|---|---|
| 4,722,959 A | * | 2/1988 | Inoue | C08K 3/22 174/110 PM |
| 2007/0202365 A1 | * | 8/2007 | Sawa | H01M 4/134 429/9 |

(Continued)

FOREIGN PATENT DOCUMENTS

| JP | 2009-188037 A | 8/2009 |
|---|---|---|
| JP | 2011-238568 A | 11/2011 |

(Continued)

OTHER PUBLICATIONS

International Search Report of PCT/JP2012/073100, dated Dec. 4, 2012. [PCT/ISA/210].

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

This invention provides a lithium secondary battery that comprises a positive electrode comprising a positive electrode active material layer and a negative electrode comprising a negative electrode active material layer. The positive electrode active material layer and the negative electrode active material layer are placed to face each other. The negative electrode active material layer has an area A comprising a non-positive-electrode-facing portion that does not face the positive electrode active material layer. The area A comprises a negative electrode active material, a hot-melt binder and a temperature-sensitive thickener. The hot-melt binder has a melting point and the temperature-sensitive thickener has a gelation temperature both in a range of 45° C. to 100° C.

14 Claims, 5 Drawing Sheets

(51) Int. Cl.
*H01M 4/13* (2010.01)
*H01M 4/139* (2010.01)

(52) U.S. Cl.
CPC .......... *H01M 10/052* (2013.01); *H01M 4/139* (2013.01); *H01M 4/622* (2013.01); *H01M 2220/20* (2013.01); *Y02E 60/122* (2013.01); *Y02T 10/7011* (2013.01)

(56) References Cited

U.S. PATENT DOCUMENTS

2007/0287064 A1* 12/2007 Suzuki .................. H01G 11/38
429/217
2009/0197175 A1* 8/2009 Nagai .................. H01G 9/016
429/231.1
2014/0248528 A1 9/2014 Takahata et al.

FOREIGN PATENT DOCUMENTS

| JP | 2012-14886 A | 1/2012 |
|---|---|---|
| WO | 2006/085416 A1 | 8/2006 |
| WO | 2013/051155 A1 | 4/2013 |

* cited by examiner

[Fig. 1]
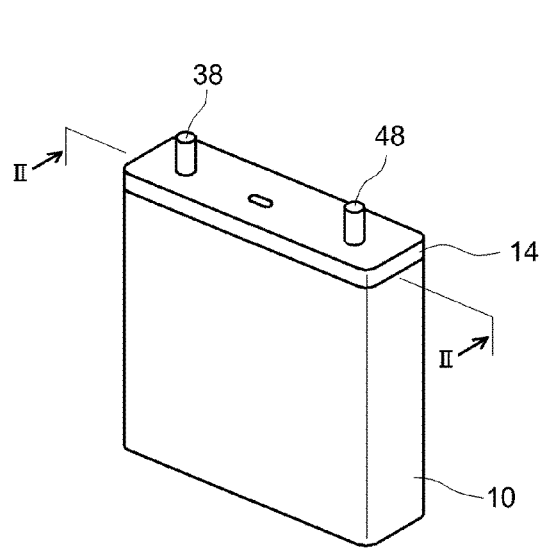
[Fig. 2]
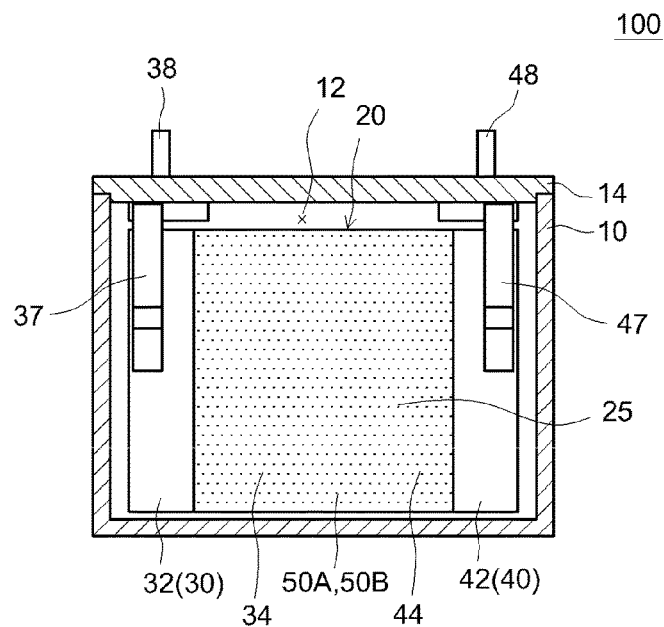

[Fig. 3]
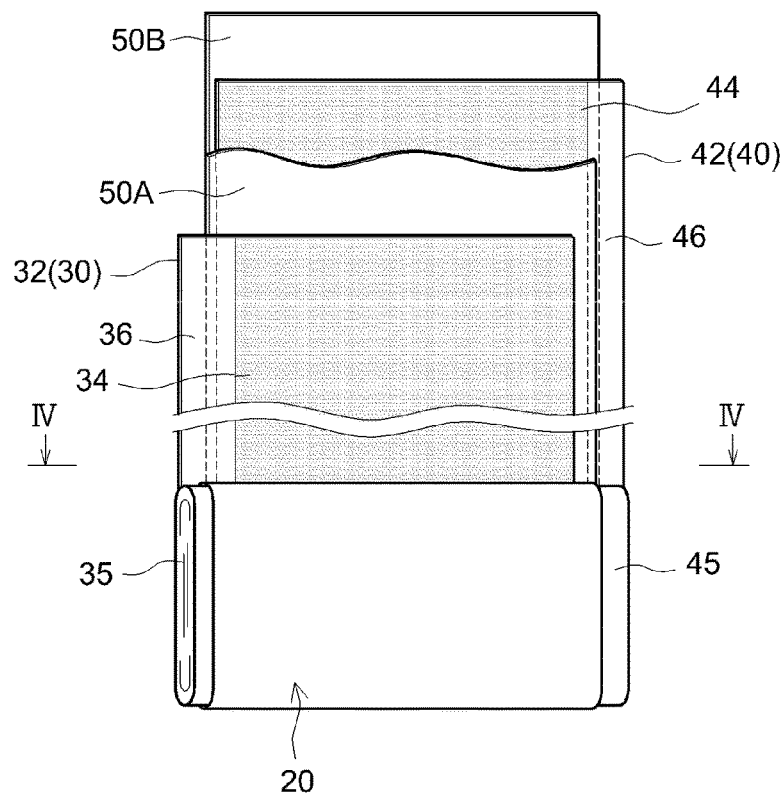

[Fig. 4]
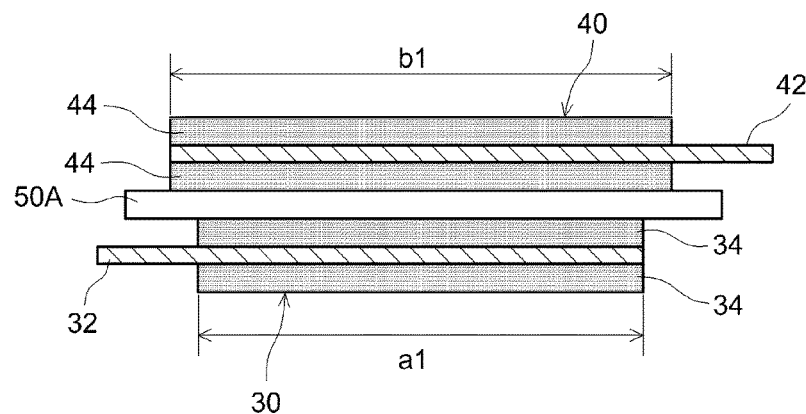
[Fig. 5]
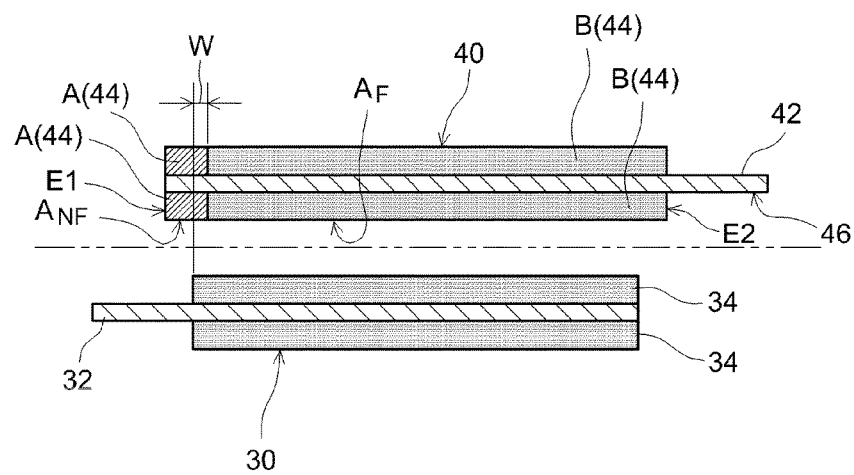

[Fig. 6]
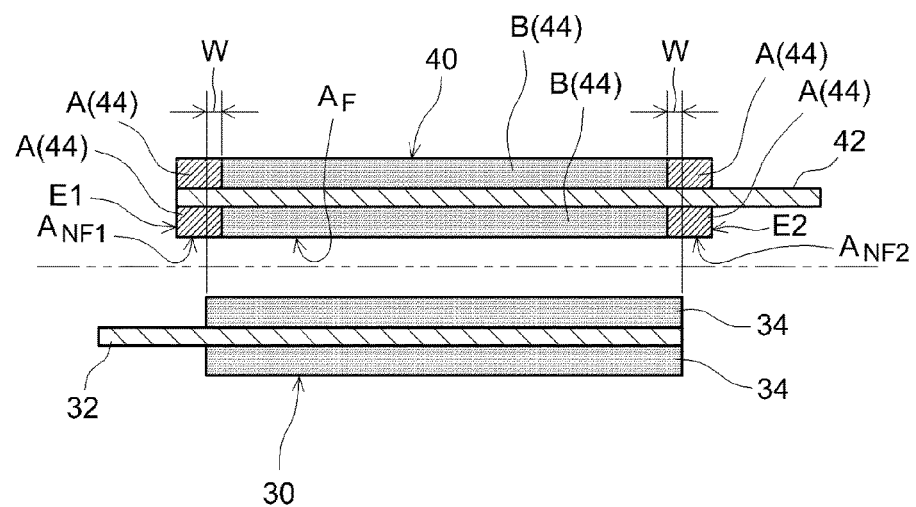
[Fig. 7]
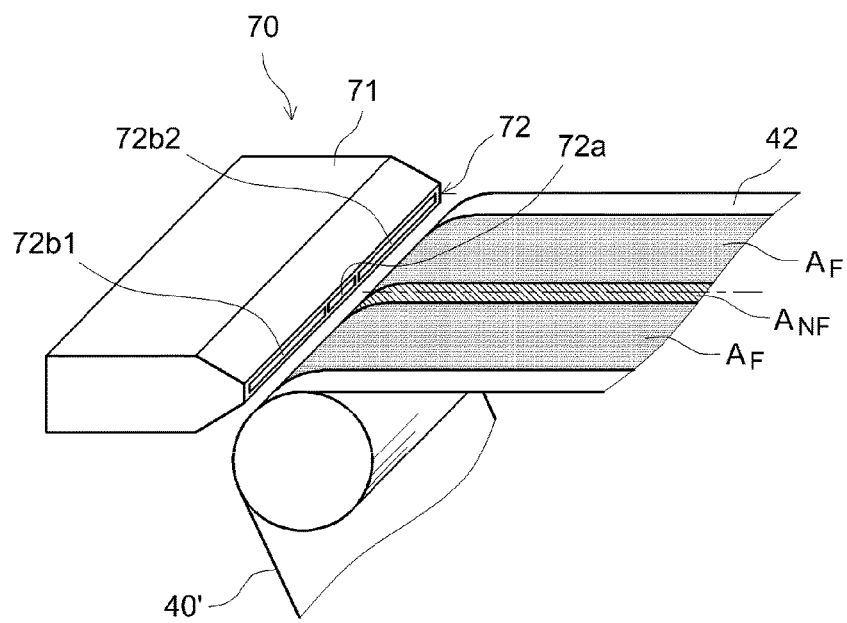

[Fig. 8]
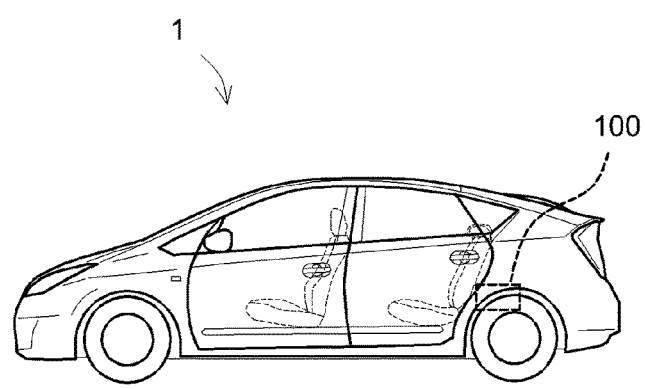

LITHIUM SECONDARY BATTERY

CROSS REFERENCE TO RELATED APPLICATIONS

This application is a National Stage of International Application No. PCT/JP2012/073100 filed Sep. 10, 2012, the contents of all of which are incorporated herein by reference in their entirety.

TECHNICAL FIELD

The present invention relates to a lithium secondary battery. In particular, it relates to a lithium secondary battery that can be applied to a power supply installed in a vehicle.

BACKGROUND ART

Being lightweight, yet capable of producing high energy densities, lithium secondary batteries are preferably used as so-called portable batteries for PCs and mobile devices, etc., and vehicle-installed batteries. In particular, great importance is placed on them as high-power batteries for driving vehicles such as electric automobiles, hybrid automobiles and the like. In a lithium secondary battery of this type, charging and discharging are mediated by cycling of lithium ions (Li ions) as the charge carrier between positive and negative electrodes. However, Li ions tend to be irreversibly fixed, for instance, in a portion (e.g. end faces) of a negative electrode not facing a positive electrode. Thus, when transported to the non-positive-electrode-facing portion, Li ions which should have contributed to charging and discharging may be irreversibly fixed, leading to degradation of the battery capacity. Literatures disclosing techniques to limit the transport of Li ions include Patent Document 1. Patent Document 2 suggests coating negative electrode's end faces with a hot-melt resin to inhibit chipping from the negative electrode's end faces.

CITATION LIST

Patent Literature

[Patent Document 1] Japanese Patent Application Publication No. 2009-188037
[Patent Document 2] Japanese Patent Application Publication No. 2012-014886

SUMMARY OF INVENTION

Technical Problem

The present invention relates to improving a lithium secondary battery and an objective thereof is to provide a lithium secondary battery for which battery properties including cycle characteristics can be increased or retained, and further, capacity degradation during high-temperature storage is inhibited.

Solution to Problem

To achieve the objective, the present invention provides a lithium secondary battery that comprises a positive electrode comprising a positive electrode active material layer and a negative electrode comprising a negative electrode active material layer. In the lithium secondary battery the positive electrode active material layer and the negative electrode active material layer are placed to face each other. Additionally, the negative electrode active material layer has an area A comprising a non-positive-electrode-facing portion that does not face the positive electrode active material layer. The area A comprises a negative electrode active material, a hot-melt binder and a temperature-sensitive thickener. The melting point of the hot-melt binder and the gelation temperature of the temperature-sensitive thickener are both in a range of 45° C. to 100° C.

According to such a constitution, the temperature-sensitive thickener acts to inhibit capacity degradation during high-temperature storage. The inclusion of the temperature-sensitive thickener in the non-positive-electrode-facing portion allows effectively inhibiting capacity degradation during high-temperature storage while retaining high levels of battery properties. The hot-melt binder also works to inhibit capacity degradation during high-temperature storage. This also effectively inhibits capacity degradation during high-temperature storage. The hot-melt binder is excellent in providing tight binding. Thus, its use in combination with the temperature-sensitive thickener favorably produces the tight binding and works to increase or retain battery properties. From the standpoint of increasing or retaining battery properties as well as inhibiting capacity degradation during high-temperature storage, the combined use of a hot-melt binder and a temperature-sensitive thickener presumably leads to favorable arrangement of the hot-melt binder and temperature-sensitive thickener. By this means, while it is possible to bring about the effect that cannot be attained without the combined use of a hot-melt binder and a temperature-sensitive thickener, that is, increased or retained battery properties such as cycle characteristics, etc., the effect of effectively inhibiting capacity degradation during high-temperature storage can be obtained.

In this description, the term "hot-melt binder" refers to a binder that is present as a solid at normal temperature and has characteristics such that it melts when heated to a prescribed temperature. In this description, the term "temperature-sensitive thickener" can be defined as a thickener that does not exhibit a thickening effect at normal temperature, but has characteristics such that when heated to a prescribed temperature, it can increase the viscosity of a composition comprising the thickener (e.g. an aqueous dispersion or solution containing the temperature-sensitive thickener at a concentration of 1 to 5% by mass). In this description, "the gelation temperature of a temperature-sensitive thickener" can be determined by differential scanning calorimetry (DSC). As a DSC measurement sample, an aqueous dispersion or solution containing the temperature-sensitive thickener at a prescribed concentration (e.g. 1 to 5% by mass) can be used.

In a preferable embodiment of the lithium secondary battery disclosed herein, when the hot-melt binder has a melting point X ° C. and the temperature-sensitive thickener has a gelation temperature Y ° C., the melting point X ° C. of the hot-melt binder and the gelation temperature Y ° C. of the temperature-sensitive thickener satisfy a relationship $|X-Y| \leq 30$. With such a constitution, melting of the hot-melt binder and gelation of the temperature-sensitive thickener take place in similar temperature ranges. Thus, presumably, they interact with each other in the temperature ranges such that the hot-melt binder and temperature-sensitive thickener are favorably arranged in the negative electrode active material layer. This further inhibits capacity degradation during high-temperature storage. The battery properties (e.g. cycle characteristics) may be further increased as well.

In a preferable embodiment of the lithium secondary battery disclosed herein, when the hot-melt binder has a melting point X ° C. and the temperature-sensitive thickener has a gelation temperature Y ° C., the melting point X ° C. of the hot-melt binder and the gelation temperature Y ° C. of the temperature-sensitive thickener satisfy a relationship X≥Y. By this, simultaneously with or prior to melting of the hot-melt binder, gelation of the temperature-sensitive thickener develops, facilitating control of the arrangement of the hot-melt binder. As a result, the hot-melt binder and temperature-sensitive thickener are thought to be arranged preferably from the standpoint of the capacity retention during high-temperature storage as well as of the battery properties.

In a preferable embodiment of the lithium secondary battery disclosed herein, the hot-melt binder has a melting point of 70° C. to 90° C. When used in combination with a temperature-sensitive thickener in a non-positive-electrode-facing portion of a negative electrode active material layer, a hot-melt binder having a melting point in such a temperature range is thought to be arranged preferably from the standpoint of retaining the capacity during high-temperature storage and increasing or retaining the battery properties. A hot-melt binder having a melting point in the temperature range can produce excellent performance (tight binding) as a binder for use in a negative electrode active material layer.

In a preferable embodiment of the lithium secondary battery disclosed herein, the temperature-sensitive thickener is a polysaccharide. The temperature-sensitive thickener is preferably a curdlan.

In a preferable embodiment of the lithium secondary battery disclosed herein, the hot-melt binder has an average particle diameter smaller than 0.1 μm. The use of a hot-melt binder of such a small diameter can effect more preferable inhibition of capacity degradation during high-temperature storage.

In a preferable embodiment of the lithium secondary battery disclosed herein, the hot-melt binder has a density of 1.2 g/cm$^3$ or smaller. Even in an embodiment using such a lightweight binder, the inclusion of the temperature-sensitive thickener presumably allows favorable arrangement of the hot-melt binder in the non-positive-electrode-facing portion of the negative electrode active material layer.

For the lithium secondary battery disclosed herein, capacity degradation is inhibited during high-temperature storage. In addition, it is possible to increase or retain the battery properties such as cycle characteristics, etc. Accordingly, with the benefit of these features, it can be preferably used as a secondary battery such as a driving power source in a vehicle such as a hybrid automobile (HV), plug-in hybrid automobile (PHV), electric vehicle (EV), etc. The present invention provides a vehicle equipped with a lithium secondary battery disclosed herein (which may be in a form of a battery system wherein several batteries are connected).

BRIEF DESCRIPTION OF DRAWINGS

FIG. 1 shows a perspective view schematically illustrating the appearance of the lithium secondary battery according to an embodiment.

FIG. 2 shows a cross-sectional view taken along the line II-II in FIG. 1.

FIG. 3 shows a perspective view schematically illustrating the state of an electrode body according to an embodiment being prepared by means of winding.

FIG. 4 shows an enlarged cross section across the line IV-IV in FIG. 3.

FIG. 5 shows a schematic cross-sectional view abstracting a positive electrode sheet and a negative electrode sheet of FIG. 4.

FIG. 6 shows a cross-sectional view corresponding to FIG. 5 and schematically illustrating another constitution of the negative electrode active material layer.

FIG. 7 shows a perspective view schematically illustrating an example of a die used for formation of a negative electrode active material layer.

FIG. 8 shows a schematic side view of a vehicle (automobile) comprising the lithium secondary battery according to an embodiment.

DESCRIPTION OF EMBODIMENTS

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator and non-aqueous electrolyte (non-aqueous electrolyte solution), the shape, etc., of the battery (case), general techniques related to construction of the battery, etc.) necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, a common reference numeral may be assigned to members or sites producing the same effect, and duplicated descriptions are sometimes omitted or simplified.

Preferable embodiments related to the lithium secondary battery are described below. In this description, the term "secondary battery" refers to a rechargeable battery in general and includes storage batteries (i.e. chemical batteries) such as lithium secondary batteries and the like as well as capacitors (i.e. physical batteries) such as electric double-layer capacitors and the like. The term "lithium secondary battery" in this description refers to a secondary battery that uses Li ions as electrolytic ions and charges and discharges by means of transfer of charges associated with Li ions between the positive and negative electrodes. To that extent, the "lithium secondary battery" in this description may include, for instance, a secondary battery using, as charge carriers, other non-lithium metal ions (e.g. sodium ions) in combination. Batteries generally called lithium-ion secondary batteries are typical examples included in the lithium secondary battery in the present description.

As shown in FIG. 1 and FIG. 2, a lithium secondary battery 100 comprises a square-shaped battery case 10 and a wound electrode body 20 contained in the battery case 10. Battery case 10 has an opening 12 on the top face. After wound electrode body 20 is placed via opening 12 into battery case 10, the opening 12 is sealed with a lid 14. Battery case 10 further contains a non-aqueous electrolyte (non-aqueous electrolyte solution) 25. Lid 14 is provided with an outer positive terminal 38 and an outer negative terminal 48. Terminals 38 and 48 partially protrude from the surface of lid 14. Part of outer positive terminal 38 is connected to an inner positive terminal 37 inside the battery case 10 while part of outer negative terminal 48 is connected to an inner negative terminal 47 inside the battery case 10.

As shown in FIG. 3, wound electrode body 20 comprises a long sheet of a positive electrode (positive electrode sheet) 30 and a long sheet of a negative electrode (negative electrode sheet) 40. Positive electrode sheet 30 comprises a length of a positive current collector 32 and a positive electrode active material layer 34 formed above at least one (typically each) face thereof. Negative electrode sheet 40 comprises a length of a negative current collector 42 and a negative electrode active material layer 44 formed above at least one (typically each) face thereof. Wound electrode body 20 further comprises two long sheets of separator (separator sheets) 50A and 50B. Positive electrode sheet 30 and negative electrode sheet 40 are layered via two separator sheets 50A and 50B, in the order of positive electrode sheet 30, separator sheet 50A, negative electrode sheet 40 and separator sheet 50B. The layered body is wound in the length direction to form a wound body. The wound body is then laterally compressed and flattened to form a flat shape. The electrode body is not limited to a wound electrode body. Depending on the shape and purpose of the battery, for instance, it may have a suitable shape and constitution such as a laminate form, etc.

On the wound electrode body 20, there is formed centrally widthwise (perpendicularly to the winding direction) a portion where the positive electrode material layer 34 formed above the surface of positive current collector 32 and negative electrode active material layer 44 formed above the surface of negative current collector 42 are thickly laminated in layers. In positive electrode sheet 30, one edge across the width direction is provided with a portion where positive current collector 32 is exposed with no positive electrode active material layer 34 formed thereon (positive electrode active material layer-free portion 36). The positive electrode active material layer-free portion 36 extends beyond separator sheets 50A, 50B and negative electrode sheet 40. That is, in wound electrode body 20, on one edge across the width direction, there is formed a positive current collector-overlapping portion 35 where the positive electrode active material layer-free portion 36 of positive current collector 32 overlaps with itself. On the other edge across the width direction in wound electrode body 20, there is formed also a negative current collector-overlapping portion 45 where the negative electrode active material layer-free portion 46 of negative current collector 42 overlaps with itself. The positive current collector-overlapping portion 35 is brought closer at a middle part and electrically connected to inner positive terminal 37 by means of welding, etc. Similarly, the negative current collector-overlapping portion 45 is also electrically connected to inner negative terminal 47.

As shown in FIG. 4, negative electrode active material layer 44 is constituted (formed) to have a width b1 larger than the width a1 of positive electrode active material layer 34. Accordingly, as shown in FIG. 5, when positive electrode sheet 30 and negative electrode sheet 40 are layered (typically when positive electrode sheet 30 and negative electrode sheet 40 are layered and wound), negative electrode active material layer 44 has a positive electrode-facing area $A_F$ that faces the positive electrode active material layer 34 and a non-positive-electrode-facing portion $A_{NF}$ that does not face the positive electrode active material layer 34. Negative electrode active material layer 44 is formed with an area A comprising the non-positive-electrode-facing portion $A_{NF}$ and an area B (an area comprising most of the positive-electrode-facing portion $A_F$) besides the area A. The composition of the negative electrode active material layer varies between the area A and area B. More specifically, area A comprises at least either a hot-melt binder or a temperature-sensitive thickener. This feature will be discussed later.

Separator 50A is constituted (formed) to have a width larger than width b1 of negative electrode active material layer 44. Placed between layers of positive electrode active material layer 34 and negative electrode active material layer 44, separator 50A prevents positive electrode active material layer 34 and negative electrode active material layer 44 from making contact with each other and causing an internal short-circuit. Separator 50B is constituted similarly to separator 50A. It is noted that negative electrode active material layer 44 is not necessarily wider than positive electrode active material layer 34 as long as it is placed so that its main portion faces the positive electrode active material layer 34 and the remaining portion does not face the positive electrode active material layer 34.

The respective components constituting the lithium secondary battery are described next. As the positive current collector constituting the positive electrode in the lithium secondary battery, a conductive material formed of a metal having good conductivity can be preferably used. As such a conductive material, for example, can be used aluminum or an alloy containing aluminum as the primary component. The positive current collector may have a variety of shapes such as a rod, plate, sheet, foil, mesh, and so on without particular limitations. The thickness of positive current collector is not particularly limited, either, and can be, for instance, 5 μm to 30 μm. The positive electrode active material layer may comprise, in addition to a positive electrode active material, additives such as a conductive material, binder, etc., as necessary.

As the positive electrode active material, various materials known to be usable as positive electrode active materials in lithium secondary batteries can be used without particular limitations. For instance, can be used a lithium transition metal compound comprising lithium (Li) and at least one species of transition metal as metal constituents, and the like. For example, can be used a spinel or layered lithium transition metal composite oxide, a polyanion-type (e.g. olivine-type) lithium transition metal compound, and the like. More specifically, for instance, the following compounds can be used.

(1) Examples of a spinel lithium transition metal composite oxide include a spinel lithium manganese composite oxide comprising at least manganese (Mn) as a transition metal. More specifically, a spinel lithium manganese composite oxide represented by a general formula $Li_pMn_{2-q}M_qO_{4+\alpha}$ is cited. Herein, p meets $0.9 \le p \le 1.2$; q meets $0 \le q < 2$, typically $0 \le q \le 1$; and a is a value satisfying $-0.2 \le \alpha \le 0.2$ while keeping a net neutral charge. When q is greater than 0 ($0 < q$), M may be one, two or more species selected from optional metals excluding Mn or non-metals.

(2) The layered lithium transition metal composite oxide includes a compound represented by a general formula $LiMO_2$. Herein, M comprises at least one species of transition metal such as Ni, Co, Mn, etc., and may further comprise other metal(s) or non-metal(s). Examples of the composite oxide include a so-called single-transition-metal-type lithium transition metal composite oxide comprising a single species among the transition metals, a so-called two-transition-metal-type lithium transition metal composite oxide comprising two species among the transition metals, and a three-transition-metal-type lithium transition metal composite oxide comprising Ni, Co and Mn as transition metals. In particular, a three-transition-metal-type lithium transition metal composite oxide is preferable. An example of the three-transition-metal-type lithium transition metal composite oxide can be represented by a general formula $Li(Li_aMn_xCo_yNi_z)O_2$ (in the formula, a, x, y and z are real numbers that satisfy a+x+y+z=1)

(3) As the positive electrode active material, can be also used a lithium transition metal composite oxide represented by a general formula $Li_2MO_3$. Herein, M comprises at least one species of transition metal such as Mn, Fe, Co, etc., and may further comprise other metal(s) or non-metal(s). Specific examples include $Li_2MnO_3$, $Li_2PtO_3$ and the like.

(4) A lithium transition metal compound (phosphate) represented by a general formula $LiMPO_4$ can be further cited. Herein, M comprises at least one species of transition metal such as Mn, Fe, Ni, Co, etc., and may further comprise other metal(s) or non-metal(s). Specific examples include $LiMnPO_4$, $LiFePO_4$ and the like.

(5) As the positive electrode active material, can be also used a lithium transition metal compound (phosphate) represented by a general formula $Li_2MPO_4F$. Herein, M comprises at least one species of transition metal such as Mn, Ni, Co, etc., and may further comprise other metal(s) or non-metal(s). Specific examples include $Li_2MnPO_4F$ and the like.

(6) A solid solution of $LiMO_2$ and $Li_2MO_3$ can be also used as the positive electrode active material. Herein, $LiMO_2$ refers to a composition represented by the general formula shown in (2) above. $Li_2MO_3$ refers to a composition represented by the general formula shown in (3) above. A specific example is a solid solution represented by $0.5LiNiMnCoO_2$-$0.5Li_2MnO_3$.

The positive electrode active materials listed above can be used singly as one species or in combination of two or more species. Among them, the positive electrode active material is preferably a three-transition-metal-type lithium transition metal composite oxide.

The positive electrode active material may further comprise one, two or more species of metal among Na, Mg, Ca, Sr, Ti, Zr, V, Nb, Cr, Mo, Fe, Rh, Pd, Pt, Cu, Zn, B, Al, Ga, In, Sn, La, W and Ce. While the amount of these metals added (their content) is not particularly limited, it is suitably 0.01% by mass to 5% by mass (e.g. 0.05% by mass to 2% by mass, typically 0.1% by mass to 0.8% by mass).

In the art disclosed herein, of the transition metal(s) contained in the positive electrode active material, Mn preferably accounts for 10% or more (e.g. 20% or more) by the number of atoms. A positive electrode active material having such a composition is preferable from the standpoint of costs and supply risks of raw materials, as it mainly uses Mn which is an abundant, inexpensive metal. A positive electrode using a positive electrode active material comprising Mn (e.g. a spinet lithium manganese composite oxide) tends to be susceptible to Mn dissolution from the positive electrode during charging and discharging at a high voltage. Accordingly, being applied to a secondary battery constructed with the positive electrode, the present invention can preferably bring about inhibition of capacity reduction caused by the dissolved transition metal (Mn).

In a preferable embodiment, as the positive electrode active material, a material having an operating voltage (vs. Li/Li$^+$) (a voltage relative to lithium metal may be expressed with "vs. Li/Li$^+$" hereinafter) higher than that of a general lithium secondary battery (about 4.1 V upper voltage limit) at least in a partial range between 0% SOC (state of charge) and 100% SOC is used. For example, can be preferably used a positive electrode active material having an upper limit of operating voltage (upper operating voltage limit) of 4.2 V (vs. Li/Li$^+$) or higher. In other words, a positive electrode active material whose maximum operating voltage is 4.2 V (vs. Li/Li$^+$) or higher in the range from 0% SOC to 100% SOC can be preferably used. The use of such a positive electrode active material can bring about a lithium secondary battery whose positive electrode operates at a voltage of 4.2 V (vs. Li/Li$^+$) or higher. The positive electrode active material may have an upper operating voltage Emit (vs. Li/Li$^+$) of preferably 4.3 V or higher (e.g. 4.35 V or higher, even 4.4 V or higher). While the upper limit of the operating voltage (vs. Li/Li$^+$) is not particularly limited, it can be 5.5 V or lower (e.g. 5.3 V or lower, typically 5.1 V or lower).

Herein, the operating voltage of a positive electrode active material can be determined as follows. In particular, a three-electrode cell is constructed, using a positive electrode comprising a positive electrode active material to be measured as a working electrode (WE), along with a lithium metal piece as a counter electrode (CO, another lithium metal piece as a reference electrode (RE), and an electrolyte solution containing approximately 1 mol/L of $LiPF_6$ in a mixed solvent at ethylene carbonate/dimethyl carbonate=30/70 (by volume). Based on the theoretical capacity of the cell, the SOC value of the cell is changed by a 5% increment from 0% SOC to 100% SOC. The SOC can be adjusted, for instance, by applying a constant-current charge across WE and CE with a general charging/discharging device or a potentiostat. The cell adjusted to each SOC value is left standing for one hour and then subjected to a measurement of voltage across WE and RE. The voltage can be recorded as the operating voltage (vs. Li/Li$^+$) of the positive electrode active material at that particular SOC value. In general, the operating voltage of a positive electrode active material is maximized over a SOC range that includes 100% SOC. Thus, the upper operating voltage Emit of the positive electrode active material (e.g., whether or not it is at least 4.2 V) can be usually assessed based on the operating voltage of the positive electrode active material at 100% SOC (i.e., when fully charged).

As the conductive material, a conductive powdery material such as carbon powder and carbon fiber are preferably used. Preferable examples of carbon powder include various kinds of carbon black, such as acetylene black, furnace black, Ketjen black, graphite powder and the Eke. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used.

Examples of the binder include various polymer materials. For instance, when the positive electrode active material layer is formed with an aqueous composition (a composition wherein water or a mixed solvent primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate based polymers; rubbers such as styrene-butadiene rubber (SBR), acrylic acid-modified SBR resins (SBR-based latexes), etc.; and the like. Alternatively, when the positive electrode active material layer is formed with a solvent-based composition (a composition whose dispersion medium for active material particles primarily comprises an organic solvent), can be used polymer materials including vinyl halide resins such as polyvinylidene fluoride (PVdF), polyvinylidene chloride (PVdC), etc.; polyalkylene oxides such as polyethylene oxide (PEO), etc.; and the like. These binders can be used singly as one species or in combination of two or more species. The polymer materials exemplified above may be used also as thickeners or other additives in the positive electrode active material layer-forming composition, besides being used as the binder.

The positive electrode active material content in the positive electrode active material layer is higher than about 50% by mass, or preferably about 70 to 97% by mass (e.g. 75% to 95% by mass). The additive content in the positive electrode active material layer is not particularly limited. The conductive material content is preferably about 1 part by mass to 20 parts by mass (e.g. 2 parts by mass to 10 parts by mass, typically 3 parts by mass to 7 parts by mass) relative to 100 parts by mass of positive electrode active material. The binder content is preferably about 0.8 part by mass to 10 parts by mass (e.g. 1 part by mass to 7 parts by mass, typically 2 parts by mass to 5 parts by mass) relative to 100 part by mass of positive electrode active material.

The method for fabricating a positive electrode as described above is not particularly limited and a conventional method can be suitably used. For instance, it can be fabricated by the following method. First, a positive electrode active material and, as necessary, a conductive material, binder, etc., are mixed with a suitable solvent (an aqueous solvent, organic solvent or a mixed solvent of these) to prepare a paste-like or slurry positive electrode active material layer-forming composition. The mixing can be carried out, for instance, using a suitable mixer (a planetary mixer, etc.). The aqueous solvent used to prepare the composition should just be aqueous as a whole and water or a solvent mixture primarily comprising water can be preferably used. Preferable examples of the organic solvent include N-methyl-2-pyrrolidone (NMP), methyl ethyl ketone, toluene, etc.

The composition thus prepared is applied to a positive current collector and then pressed after the solvent is allowed to evaporate off by drying. As a method for applying the composition to the positive current collector, can be suitably employed a technique similar to conventionally-known methods. For example, with a suitable applicator such as die coater and the like, the composition can be preferably applied to the positive current collector. The solvent can be dried off well by employing any one or a combination of natural drying, heated air drying, vacuum drying, and so on. As a pressing method, can be employed a compression method such as a conventionally-known roll-pressing method, etc. A positive electrode can be thus obtained having a positive electrode active material layer formed above the positive current collector.

The coating weight of positive electrode active material layer (non-volatile-based coating amount of positive electrode active material layer-forming composition) per unit surface area of positive current collector is not particularly limited. From the standpoint of obtaining sufficient conductive paths (conducting paths), it is preferably 3 mg/cm$^2$ or greater (e.g. 5 mg/cm$^2$ or greater, typically 6 mg/cm$^2$ or greater), but 45 mg/cm$^2$ or less (e.g. 28 mg/cm$^2$ or less, typically 18 mg/cm$^2$ or less) per face of positive current collector. The positive electrode active material layer preferably has a thickness per face of positive current collector of 30 µm or larger (e.g. 50 µm or larger, typically 70 µm or larger), but 120 µm or smaller (e.g. 100 µm or smaller, typically 80 µm or smaller).

As the negative current collector constituting the negative electrode (e.g. a negative electrode sheet), can be preferably used a conductive member formed of a metal having a good conductivity. For example, can be used copper or an alloy comprising copper as the primary component. The shape of negative current collector is not particularly limited as it may vary in accordance with the shape of the battery, etc. It may be in various forms including shapes of a rod, plate, sheet, foil, mesh, and so on. The thickness of negative current collector is not particularly limited, either. It can be about 5 µm to 30 µm.

The negative electrode active material layer disclosed herein has an area A comprising a non-positive-electrode-facing portion that does not face the positive electrode active material layer and an area B comprising most of a positive-electrode-facing portion that faces the positive electrode active material. Typically, the negative electrode active material layer may consist of the area A and area B. In this case, the area B can be defined as the other areas besides the area A in the negative electrode active material layer. In the present description, as it naturally implies, that the concept of "the negative electrode active material layer facing the positive electrode active material layer" includes the two facing across a separator, etc.

The area A in the negative electrode active material layer includes a non-positive-electrode-facing portion that does not face the positive electrode active material layer and may include an end face of the negative electrode active material layer. For instance, in negative electrode sheet 40 as shown in FIG. 5, in the width direction (horizontal direction in FIG. 5) of negative electrode sheet 40, when the two ends of negative electrode active material layer 44 are represented by an end E1 (on the left in FIG. 5) and an end E2 (on the right in FIG. 5), respectively, the area A is preferably an area including the end E1 (in FIG. 5, an area designated by letter A). This is because at the end E1, when compared to at the end E2, there is an increased tendency that Li ions react with a component (e.g. a metal such as a transition metal, etc.) dissolved out from the positive electrode to be irreversibly fixed. Thus, the effect of the hot-melt binder or temperature-sensitive thickener described later is thought to be readily produced. Herein, the end E1 refers to the widthwise end all the way through which negative electrode active material layer 44 is formed on negative current collector 42 while the end E2 refers to the other end where a negative electrode active material layer-free portion is provided on negative current collector 42.

The area A is not limited to the areas described above. For instance, it can be formed as shown in FIG. 6. In particular, negative electrode active material layer 44 shown in FIG. 6 has a positive-electrode-facing portion $A_F$ facing positive electrode active material layer 34 and non-positive-electrode-facing portions $A_{NF1}$ and $A_{NF2}$ not facing positive electrode active material layer 34. The area A may be an area (indicated by letter A in FIG. 6) that comprises non-positive-electrode-facing portions $A_{NF1}$ and $A_{NF2}$ as well as the two ends E1 and E2 of negative electrode active material layer 44.

Near the surface layer of the area A including a non-positive-electrode-facing portion as described above, there is a portion rich in highly reactive Li ions. On the other hand, the end (including the end face) of the positive electrode active material layer facing the negative electrode active material layer is located in an area from which Li ions can be released toward both the positive-electrode-facing portion and non-positive-electrode-facing portions in the negative electrode active material layer. Accordingly, more Li ions are released than from the other areas, giving rise to a tendency toward a higher voltage. At a higher voltage, there is a tendency toward dissolution of a component (e.g. a metal such as a transition metal, etc.) from the positive electrode active material layer. The dissolved component may be transported to the non-positive-electrode-facing portions in the negative electrode active material layer and undergo a reaction with the highly reactive Li ions to be irreversibly fixed. Based on the above, as compared to the other areas, the area A may have a greater tendency to deactivate Li ions that should contribute to charging and discharging.

The area A preferably corresponds to the non-positive-electrode-facing portions. In other words, the area A is preferably a non-positive-electrode-facing portion. From the standpoint of the precision of manufacturing, it is not easy to have an area A to precisely match a non-positive-electrode-facing portion. In view of this, it is preferable to constitute the area A to include a non-positive-electrode-facing portion. With increasing proportion of area A, while a greater effect of inhibiting capacity degradation during high-temperature storage may be obtained, other battery properties may be degraded. Accordingly, in an embodiment using long electrode sheets (long positive and negative electrode sheets), in the width direction of the electrode sheets, it is preferable to constitute the area A so as to extend beyond the boundary (line) between a positive-electrode-facing portion and a non-positive-electrode-facing portion by a prescribed distance W to the positive-electrode-facing portion side. The distance W is not particularly limited as it may vary depending on the size of the electrode body. It should just be larger than 0 mm and can be 0.1 mm or larger (e.g. 0.5 mm or larger, typically 1 mm or larger). It may be 10 mm or smaller (e.g. 5 mm or smaller, typically 3 mm or smaller).

Alternatively, the area A may be formed, limited to a portion that is most susceptible to irreversible reactions of Li ions (typically an end face or its vicinity of the negative electrode active material layer). Typically, the area A may be constituted to extend in the width direction of the electrode sheets beyond the boundary (line) between a positive-electrode-facing portion and a non-positive-electrode-facing portion by a prescribed distance W to the side of the above-mentioned end face of the negative electrode active material layer. The distance W is not particularly limited as it may vary depending on the size of the electrode body. It can be 0.1 mm to 3 mm (e.g. 0.5 mm to 2 mm, typically 0.7 mm to 1 mm).

Although not particularly limited, the area A to area B volume ratio (A:B) can be 0.5:99.5 to 20:80 (e.g. 1:99 to 10:90, typically 2:98 to 8:92). With increasing volume proportion of area A, there is a greater tendency toward inhibition of capacity degradation during high-temperature storage. With increasing volume proportion of area B, there is a greater tendency toward increased or retained battery properties such as cycle characteristics, etc.

Similarly to heretofore known negative electrode active material layers, the area B of the negative electrode active material layer comprises a negative electrode active material capable of storing and releasing lithium ions serving as charge carriers. The composition or form of the negative electrode active material is not particularly limited. Among materials conventionally used in lithium secondary batteries, one, two or more species can be used. Examples of such negative electrode active materials include carbon materials generally used in lithium secondary batteries. Typical examples of such carbon materials include graphite carbons (graphite), amorphous carbons and the like. It is preferable to use a granular carbon material (carbon particles) containing a graphite structure (layered structure) at least partially.

In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used. As other negative electrode active materials, oxides such as lithium titanate, etc.; silicon materials, tin materials and so on can be used singly, as an alloy, as a compound formed therefrom or as a composite material combining these materials. In particular, it is especially preferable to use a negative electrode active material having a reduction potential (vs. $Li/Li^+$) of about 0.5 V or lower (e.g. 0.2 V or lower, typically 0.1 V or lower). The use of a negative electrode active material having such a reduction potential can bring about a high energy density. Examples of a material exhibiting such a low potential include a graphitic carbon material (typically graphite particles). The negative electrode active material content in the negative electrode active material layer is greater than about 50% by mass and preferably about 90 to 99% by mass (e.g. 95 to 99% by mass, typically 97 to 99% by mass).

In addition to the negative electrode active material, the area B in the negative electrode active material layer can further comprise, as necessary, one, two or more species of binder, thickener or other additive that can be added to negative electrode active material layers in general lithium secondary batteries. The binder can be various polymeric materials. For instance, with respect to a water-based composition or a solvent-based composition, binders that can be contained in the positive electrode active material layer can be preferably used. Such binder can be used not only as a binder, but also as a thickener or other additive in the negative electrode active material layer-forming composition. The additive content in the negative electrode active material layer is not particularly limited. It is preferably about 0.5 to 10 parts by mass (e.g. about 0.8 to 5 parts by mass, typically 1 to 3 parts by mass) relative to 100 parts by mass of negative electrode active material.

The area B is preferably free of a hot-melt binder and a temperature-sensitive thickener described later. A hot-melt binder is thought to be active in inhibiting the transport of Li ions as described later. A temperature-sensitive thickener is also thought to be active in inhibiting the transport of Li ions at high temperatures. Accordingly, if a hot-melt binder or a temperature-sensitive thickener is included throughout the entire negative electrode active material layer, the transport of Li ions may be inhibited in areas where the positive electrode active material layer faces the negative electrode active material layer (positive-electrode-facing portion), resulting in degraded charge-discharge characteristics. From the standpoint of ensuring excellent battery properties (e.g. charge-discharge characteristics), it is thus desirable that the area B comprising the positive-electrode-facing portion is free of at least either a hot-melt binder or a temperature-sensitive thickener (preferably both).

The area A in the negative electrode active material layer can comprise the negative electrode active material, binder, thickener and other additive(s) that can be used in the area B, but has a composition different from that of the area B. More specifically, the area A (at least its non-positive-electrode-facing portion) comprises at least either a hot-melt binder or a temperature-sensitive thickener in place of or in addition to the binder and thickener.

The hot-melt binder disclosed herein may be present as a solid at normal temperature (20° C. to 30° C.) and have characteristics such that it melts when heated to a prescribed temperature. Having certain hot-melt characteristics, the hot-melt binder is thought to be arranged to hinder reactions of Li ions at an end face and the surface layer of the negative electrode active material layer. For instance, it is thought to be arranged to coat the negative electrode active material in the non-positive-electrode-facing portion. This arrangement is thought to be preferably obtained by gelation of a temperature-sensitive thickener used in combination, which will be discussed later. The hot-melt binder is nonconductive and is thought to inhibit the permeation of Li ions. Thus, at a high temperature, it presumably works to prevent Li ions at the negative electrode (typically the negative electrode's surface layer) from reacting with the component dissolved out from the positive electrode to turn into irreversible capacity. The reaction is likely to take place in the non-positive-electrode-facing portion of the negative electrode active material layer. Thus, the inclusion of the hot-melt binder in the area comprising the non-positive-electrode-facing portion is expected to efficiently inhibit the reaction. Inhibition of the reaction leads to inhibition of excessive release of Li ions from the ends (typically from the end faces) of the opposing positive electrode. It is also expected to prevent a local voltage increase (typically a voltage increase at an end face of the positive electrode) caused by excessive release of Li ions. The local voltage increase causes dissolution of a positive electrode component (e.g. a metal such as a transition metal, etc.). Thus, the inhibition of the occurrence of a local voltage increase leads to inhibition of dissolution of a positive electrode component which can cause irreversible Li ion fixation. These activities preferably bring about inhibition of capacity degradation (especially during high-temperature storage).

The melting point of the hot-melt binder is thought to be preferably in the temperature range used during formation of the negative electrode active material layer (typically in the temperature range used in the drying process). Because of this, it may melt, for instance, when forming the negative electrode active material layer (typically in the drying process) and may be arranged to coat the negative electrode active material in the non-positive-electrode-facing portion(s). In a preferable embodiment disclosed herein, the hot-melt binder has a melting point of 40° C. or above (e.g. 50° C. or above, typically 55° C. or above). In another preferable embodiment, it may be 60° C. or above (e.g. 65° C. or above, typically 70° C. or above). The melting point is preferably 120° C. or below (e.g. 100° C. or below, typically 90° C. or below). The method for measuring the melting point is not particularly limited. The melting point can be measured based on a heretofore known measurement method. For instance, as the melting point, can be used its melting peak temperature obtainable when heated at a heating rate of 10° C./min, using DSC.

For example, after the hot-melt binder melts down by heating, etc., in the drying process during formation of the negative electrode active material layer, the binder is thought to solidify again to exhibit excellent binding activity. Thus, as compared to heretofore known binders formed from materials (polymers such as resins, rubbers, etc.) that are not hot melt or do not exhibit hot-melt characteristics in prescribed temperature ranges, it is thought to provide excellent binding among active material particles and between the active material layer and current collector. In particular, an area A including the hot-melt binder is located at an end of the negative electrode active material layer and thus is susceptible to falling of the negative electrode active material layer from the current collector. End faces of the negative electrode active material layer are also susceptible to defection of the negative electrode active material. The inclusion of the hot-melt binder in the area A including such portions is thought to preferably provide the tight binding and thereby prevent defection of the negative electrode active material and peeling of the negative electrode active material layer so as to increase battery properties (especially charge-discharge characteristics at high temperatures). Presumably, the effect can be more preferably obtained by the use of a temperature-sensitive thickener that allows suitably disperse arrangement of the hot-melt binder in the negative electrode active material layer.

The arrangement described above, that is, the arrangement of the hot-melt binder that is thought to be obtained by its use in combination with a temperature-sensitive thickener, is presumed to provide not only the capacity degradation inhibition, but also the following advantages. In particular, when a hot-melt binder is used alone without the use of a temperature-sensitive thickener, it is thought that the hot-melt binder is not favorably arranged between the active material layer and current collector and excellent binding can be hardly produced. In this case, electron-exchangeable areas are reduced between the active material layer and current collector, resulting in degraded battery properties. Even if favorable binding is obtained, since the hot-melt binder is nonconductive, it may hinder the exchange of electrons depending on its arrangement. Its use in combination with a temperature-sensitive thickener presumably ensures sufficient binding between the active material layer and current collector and preferably brings about its arrangement that allows smooth exchange of electrons.

The hot-melt binder preferably has an average particle diameter smaller than 0.3 μm (e.g. smaller than 0.1 μm, typically smaller than 0.08 μm). A hot-melt binder of such a small diameter may tend to coat the negative electrode active material thinly and evenly. It may also have a greater tendency to inhibit the permeation of Li ions. Accordingly, it is expected to sufficiently prevent the component dissolved out from the positive electrode and Li ions on the negative electrode surface from undergoing a reaction to yield irreversible capacity, and to more preferably inhibit capacity degradation during high-temperature storage. While the lower limit of average particle diameter of hot-melt binder is not particularly limited, it is suitably about 0.01 μm or larger. The average particle diameter of hot-melt binder is measured by a Coulter counter method. The Coulter counter method detects the electric resistance of sample particles passing through fine pores. For instance, it can be measured with trade name "MULTISIZER 3" available from Beckman Coulter, Inc. or a similar system.

The hot-melt binder preferably has a density of 1.2 g/cm$^3$ or smaller (e.g. 1.1 g/cm$^3$ or smaller, typically 0.5 g/cm$^3$ to 1.0 g/cm$^3$). It is thought that such a lightweight binder melts during formation of the negative electrode active material layer and its presence is localized near the surface with a great tendency toward uneven distribution. However, its inclusion in combination with a temperature-sensitive thickener described later is thought to suitably inhibit the localization. By this effect, while capacity degradation is inhibited during high-temperature storage, degradation of battery properties (e.g. degradation of low-temperature cycle characteristics, an increase of battery resistance) due to the uneven distribution can be prevented. The density of hot-melt binder can be determined based on JIS K6760 when the hot-melt binder is formed of a polyolefin-based resin. When it is formed of any other material, the density can be measured based on JIS K6760 or by suitably employing a heretofore known density measurement method.

As the hot-melt binder having the characteristics described above, a synthetic resin (typically a thermoplastic resin) is preferably used. The synthetic resin is not particularly limited. Examples include polyolefins such as a polyethylene (PE), ethylene-vinyl acetate copolymer (EVA), ethylene-unsaturated carboxylic acid copolymer (e.g. ethylene-methacrylic acid copolymer (EMAA), ethylene-acrylic acid copolymer (EAA)), etc.; acrylic polymers (copolymers) such as polymethyl (meth)acrylate, etc.; and the like. Among them, an ethylene-unsaturated carboxylic acid polymer is preferable and an EMAA is particularly preferable.

The hot-melt binder disclosed herein is preferably an ionomer resin. The ionomer resin can be defined as a polymer that is formed of a main polymer chain primarily constituted with a hydrocarbon and has side chain carboxyl groups or side chain sulfonate groups which are at least partially neutralized with a metal ion, organic amine, ammonia or the like. Such an ionomer resin may be an aggregate (ionic cluster) formed of a polymer aggregated (clustered) due to the activity of the metal ion, etc. Specific examples of the ionomer resin include an ethylene-unsaturated carboxylic acid copolymer having side chain carboxyl groups which are at least partially neutralized with a metal cation.

The structure of the ethylene-unsaturated carboxylic acid copolymer is not particularly limited. It may be a random copolymer or a graft copolymer. Examples of the graft copolymer include a copolymer in which PE is graft polymerized with an unsaturated carboxylic acid.

As the unsaturated carboxylic acid, an unsaturated carboxylic acid having 3 to 8 carbon atoms is preferably used. Specific examples of the unsaturated carboxylic acid having 3 to 8 carbon atoms include acrylic acid, methacrylic acid, maleic acid, fumaric acid, itaconic acid, crotonic acid, isocrotonic acid, citraconic acid and the like. These can be used singly as one species or in combination of two or more species. In particular, acrylic acid and methacrylic acid are preferable.

The ethylene-unsaturated carboxylic acid copolymer may comprise, in addition to the ethylene and unsaturated carboxylic acid, a third component copolymerizable with the ethylene or unsaturated carboxylic acid. Examples of the third component include unsaturated carboxylic acid esters (typically acrylic acid esters) such as methyl (meth)acrylate, ethyl (meth)acrylate, butyl (meth)acrylate, etc.; vinyl esters such as vinyl acetate, etc.; and the like.

The ethylene and unsaturated carboxylic acid in the ethylene-unsaturated carboxylic acid copolymer preferably has an ethylene to unsaturated carboxylic acid mass ratio in a range of 60:40 to 99:1. The mass ratio (ethylene:unsaturated carboxylic acid) is preferably 60:40 to 98:2 (e.g. 70:30 to 95:5, typically 75:25 to 92:8). When the ethylene-unsaturated carboxylic acid copolymer comprises a third component, the third component content is preferably 40% by mass or lower (e.g. 10% by mass or lower, typically 5% by mass or lower). The copolymer may be essentially free of a third component. In other words, the ethylene-unsaturated carboxylic acid copolymer may be formed of an ethylene and an unsaturated carboxylic acid.

In the ionomer resin, the carboxyl groups and/or sulfonate groups present as side chains in the polymer are at least partially neutralized with a monovalent to trivalent metal cation, organic amine, ammonia, etc. Examples of the metal cation include monovalent metal ions such as sodium ion ($Na^+$), potassium ion ($K^+$), lithium ion ($Li^+$), etc.; divalent metal ions such as magnesium ion ($Mg^{2+}$), zinc ion ($Zn^{2+}$), calcium ion ($Ca^{2+}$), copper ion ($Cu^{2+}$), iron ion ($Fe^{2+}$), barium ion ($Ba^{2+}$), etc.; and trivalent metal ions such as aluminum ion ($Al^{3+}$). In particular, $Na^+$ and $Zn^{2+}$ are preferable.

Specific examples of a hot-melt binder having the characteristics described above include "CHEMIPEARL S650" (ionomer resin particles of ethylene-methacrylic acid copolymer available from Mitsui Chemicals, Inc.). This product has a minimum film formation temperature of 55° C. and stable film formation is possible at a temperature of 80° C. Thus, the melting point is presumably 55° C. or above, but 80° C. or below, or in a certain range (e.g. 80° C.±20° C., typically 80° C.±10° C.) including 80° C. at which stable film formation is possible.

The hot-melt binder content in the area A of the negative electrode active material layer is not particularly limited. It is preferably about 0.1 to 5 parts by mass (e.g. 0.2 to 3 parts by mass, typically 0.3 to 1 part by mass) relative to 100 parts by mass of negative electrode active material. The hot-melt binder usage in this range preferably brings about excellent high-temperature characteristics. It also preferably brings about inhibition of battery resistance elevation and excellent low-temperature characteristics.

The temperature-sensitive thickener included in the area A of the negative electrode active material layer may not exhibit a thickening effect at normal temperature (20° C. to 30° C.), but have characteristics such that when heated to a certain temperature, it increases the viscosity of a composition (which may be a liquid, paste-like, or slurry composition) containing the thickener. Herein, exhibiting a thickening effect refers to increasing of viscosity and can be understood as gelation (e.g. increasing of gel strength) as well. In this case, the temperature-sensitive thickener can be referred to as a temperature-sensitive gelling agent.

The gel strength measurement is not particularly limited and can be carried out by a known means. For example, it can be measured by a method described next: A sample to be measured is dispersed or dissolved in deionized water to a prescribed concentration (e.g. 1 to 5% by mass, typically 3% by mass). The resulting aqueous dispersion or solution is heated at a certain temperature (e.g. for about 10 minutes). Subsequently, it is cooled to room temperature (e.g. 20° C. to 30° C.) and the gel strength can be then measured. The gel strength can be determined with a commercial meter (e.g. a creep meter, compact table-top universal tester, etc.), by allowing a plunger having a prescribed contact area (e.g. a cylindrical plunger of 3 mm to 16 mm diameter) to penetrate the measurement sample at a prescribed speed (e.g. 1 mm/sec to 3 mm/sec) and measuring the force at failure. The initial temperature at which the gel strength started to increase as obtained by the method described above can be conveniently used as the gelation temperature described later.

The temperature-sensitive thickener works to inhibit capacity degradation during high-temperature storage. While it is unnecessary to reveal the mechanism, it is thought to be associated with its gelation. In particular, when a battery is at a high temperature (e.g. at 50° C. or higher), the gelated temperature-sensitive thickener presumably works to inhibit the transport of Li ions. By this, it is thought that at such a high temperature that causes dissolution of a component from the positive electrode, it inhibits Li ions from reacting with the dissolved positive electrode component and getting irreversibly fixed, thereby reducing the amount of Li ions that can no longer contribute to charging and discharging. The reaction (i.e. the reaction leading to irreversible Li ion fixation) is likely to take place in the non-positive-electrode-facing portions of the negative electrode active material layer. Thus, it is thought that by means of including the temperature-sensitive thickener in areas comprising the non-positive-electrode-facing portions, while retaining high levels of battery properties, capacity degradation can be effectively inhibited during high-temperature storage. It is thought that the temperature-sensitive thickener exhibits a thickening effect, for example, in forming a negative electrode active material layer (typically when heated in a drying process); and by this effect, the hot-melt binder can be placed where it is easy to inhibit the reaction between the dissolved positive electrode component and Li ions in the negative electrode. It is also possible to think that at a high temperature, this indirectly prevents Li ions in the negative electrode (typically in the surface layer of negative electrode) from reacting with the component dissolved from the positive electrode and contributing to irreversible capacity. In this case, it is thought that inhibition of irreversible Li ion fixation lead to inhibition of excessive release of Li ions from the opposing positive electrode, preventing the positive electrode from having a higher local voltage (typically a higher voltage at an end face of the positive electrode). Since the higher local voltage causes dissolution of a positive electrode component (e.g. a metal such as a transition metal, etc.), inhibition of the occurrence of a higher voltage leads to inhibition of dissolution of a positive electrode component that can cause irreversible Li ion fixation. These activities are thought to preferably bring about inhibition of capacity degradation. In particular, battery capacity degradation is significantly inhibited during storage at a high temperature (e.g. 40° C. or above, typically 50° C. to 80° C.).

The temperature-sensitive thickener may not exhibit a thickening effect at normal temperature. For example, it may be present in a sol state. Thus, while being in the sol state, it is thought to allow the permeation of Li ions. It is thought that when the negative electrode active material layer is coated with the temperature-sensitive thickener in combination with the hot-melt binder, a coating can be formed, including the presence of both the hot-melt binder and temperature-sensitive thickener. In other words, on the negative electrode active material surface, there are presumably formed a Li ion-Mocking portion with the hot-melt binder and a temperature-sensitive Li ion-permeable portion with the temperature-sensitive thickener. Among these, the temperature-sensitive Li ion-permeable portion allows the transport of Li ions at a temperature not so high (e.g. below 35° C.); and therefore, it is thought unlikely to hinder the charging and discharging characteristics as compared to the hot-melt binder. In other words, it is thought that through its arrangement, the temperature-sensitive thickener preferably prevents battery property degradation caused by the hot-melt binder (especially by its Li ion-Mocking activity).

The temperature-sensitive thickener preferably has a gelation temperature of 35° C. or above. This is thought to preferably bring about arrangement of the hot-melt binder to coat the negative electrode active material. For instance, it is thought to provide such a function when forming the negative electrode active material layer (typically when heated in a drying process). It is also thought to undergo gelation when the battery reaches a high temperature, and act to inhibit the transport of Li ions present in the negative electrode active material layer. Thus, at such a high temperature that a component (e.g. a metal such as a transition metal, etc.) is likely to dissolve out from the positive electrode, it is presumed to preferably inhibit Li ions from undergoing a reaction with the dissolved positive electrode component and getting irreversibly fixed.

The gelation temperature is more preferably 40° C. or above (e.g. 45° C. or above, typically 50° C. or above). The gelation temperature may be 55° C. or above as well. The gelation temperature is preferably 120° C. or below (e.g. 100° C. or lower, typically 80° C. or below). The gelation temperature of a temperature-sensitive thickener can be determined by subjecting an aqueous dispersion or solution containing the temperature-sensitive thickener at a certain concentration (e.g. 1 to 5% by mass, typically 3% by mass) to a DSC measurement. For instance, the gelation temperature in a DSC curve with increasing temperature can be determined by detecting its endothermic peak. The gelation temperature in a DSC curve with decreasing temperature can be determined by detecting its exothermic peak. When the temperature-sensitive thickener shows sol-gel transition characteristics, the gelation temperature can be thought as the sol-gel transition temperature as well.

The temperature-sensitive thickener is preferably a thermoreversible gelling agent such that after it is gelated, it returns to a non-gel state (e.g. a sol state) when the temperature falls down. Such a gelling agent can be defined as a gelling agent that undergoes reversible gelation/ungelation by heat (by a temperature change). It is thought that by this, when the battery is at a high temperature, it acts to inhibit the transport of Li ions and thereby to inhibit capacity degradation; and, for instance, at normal temperature (20° C. to 30° C.), while being in a non-gel state, it allows the transport of Li ions and does not hinder charging or discharging. In this case, the ungelation temperature can be in the same temperature range as the gelation temperature. For example, it can be 35° C. or above, but below 80° C. (typically 40° C. or above, but 70° C. or below). Alternatively, the temperature-sensitive thickener can be a non-thermoreversible gelling agent which undergoes irreversible gelation at or above a certain temperature (e.g. at 70° C. or above, typically at 80° C. or above).

When the hot-melt binder has a melting point X ° C. and the temperature-sensitive thickener has a gelation temperature Y ° C., the melting point X ° C. of the hot-melt binder and the gelation temperature Y ° C. of the temperature-sensitive thickener preferably satisfy a relationship |X−Y|≤30 (e.g. |X−Y|≤20, typically |X−Y|≤10). By this, melting of the hot-melt binder and gelation of the temperature-sensitive thickener take place in similar temperature ranges. It is thus presumed that, for instance, when forming the negative electrode active material layer (e.g. when heated in the drying process), they interact with each other in the temperature ranges, and the two are favorably arranged in the negative electrode active material layer.

The gelation temperature of the temperature-sensitive thickener is preferably equal to or below the melting point of the hot-melt binder (X≥Y). The gelation temperature of the temperature-sensitive thickener is more preferably below the melting temperature of the hot-melt binder (X>Y). With such a constitution, for instance, in the drying process in forming the negative electrode active material layer, the thickening effect of the temperature-sensitive thickener is produced simultaneously with or prior to the melting of the hot-melt binder. This preferably inhibits localization of the hot-melt binder upon melting, with the binder having a lower specific gravity than the negative electrode active material.

Examples of the temperature-sensitive thickener include a linear or branched (preferably linear) polysaccharide including a β-1,3-glucan. Alternatively, it may be a polysaccharide including a cellulose. While the degree of polymerization of these polysaccharides is not particularly limited, it is preferably about 5 to 6000 (e.g. 100 to 1000). The average particle diameter of the temperature-sensitive thickener is not particularly limited. For instance, it is preferably 10 µm to 200 µm (typically 50 µm to 150 µm). As for the average particle diameter, can be used its median diameter (mean particle diameter $D_{50}$: 50% volume cumulative particle diameter) determined from a size distribution measured with a particle size analyzer based on laser scattering/diffraction spectroscopy. Specific examples of the temperature-sensitive thickener include β-1,3-glucans such as a curdlan, pachyman, laminaran, etc.; and celluloses such as methyl cellulose, etc. These can be used singly as one species or in combination of two or more species. Among them, a curdlan is particularly preferable for its properties to swell and undergo gelation when heated to or above about 50° C.

The temperature-sensitive thickener content in the area A of the negative electrode active material layer is not particularly limited. It is preferably about 0.1 to 5 parts by mass (e.g. 0.2 to 3 parts by mass, typically 0.3 to 1 part by mass) relative to 100 parts by mass of negative electrode active material. When the temperature-sensitive thickener usage is within this range, capacity degradation is preferably inhibited during high-temperature storage. Degradation of battery properties (especially high-temperature cycle characteristics) is preferably inhibited as well.

In the area A of the negative electrode active material layer, the mass ratio of hot-melt binder to temperature-sensitive thickener is not particularly limited. From the standpoint of bringing about favorable arrangement of the hot-melt binder and temperature-sensitive thickener, it is preferably 9:1 to 1:9 (e.g. 7:3 to 3:7, typically 6:4 to 4:6).

The method for forming the negative electrode active material layer is not particularly limited. For instance, the following method can be used. The method comprises obtaining a composition for forming an area A in a negative electrode active material layer (or a composition A hereinafter) and a composition for forming an area B in the negative electrode active material layer (or a composition B hereinafter); applying the obtained composition A to an area corresponding to a non-positive-electrode-facing portion in a negative electrode; and applying the obtained composition B to an area corresponding to a positive-electrode-facing portion in the negative electrode. The method is described in detail below.

In this method for forming a negative electrode active material layer, a composition A is obtained. The composition A comprises a negative electrode active material, a hot-melt binder, and a temperature-sensitive thickener. These are mixed with a suitable solvent (an aqueous solvent, organic solvent, or a mixed solvent of these) to prepare a paste-like or slurry composition A. Additionally, a negative electrode active material and additive(s) such as a binder are mixed with a suitable solvent (an aqueous solvent, organic solvent or a mixed solvent of these) to prepare a paste-like or slurry composition B. As the solvent, the solvent used in fabricating the positive electrode can be preferably used.

Subsequently, the paste-like or slurry composition A prepared is provided (typically applied) to a non-positive-electrode-facing portion on a negative current collector and the composition B is provided (typically applied) to a positive-electrode-facing portion on the negative current collector. For example, with a die coater 70 having a constitution as schematically shown in FIG. 7, the composition A and composition B can be provided to the negative current collector.

The die coater 70 will be described now. A die 71 constituting die coater 70 has a wide discharge port 72. Discharge port 72 in die 71 is divided into an intermediate section 72a and two side sections 71b1 and 72b2. Inside the die 71, there are formed channels connected to the intermediate section 72a and two side sections 72b1 and 72b2. To the intermediate section 72a and two side sections 72b1 and 72b2 of discharge port 72, composition A and composition B are supplied from different tanks via different channels. The intermediate section 72a of discharge port 72 in die 71 is matched against a portion to form a non-positive-electrode-facing portion $A_{NF}$ on negative current collector 42. The two side sections 72b1 and 72b2 of discharge port 72 in die 71 are matched against portions to form positive-electrode-facing portions $A_F$ on negative current collector 42. This can provide the composition A to the non-positive-electrode-facing portion $A_{FN}$ and the composition B to the positive-electrode-facing portions $A_F$. Other components of die coater 70 can be constituted by suitably modifying a heretofore known constitution to suit the constitution of die 71. Thus, no description is provided in particular.

The negative current collector provided with composition A and composition B is subjected to a drying process. The drying method is not particularly limited. While a heretofore known drying method can be suitably employed, drying by heating (typically hot air blow drying) is desirable. In this case, while the drying temperature is not particularly limited, in order to obtain favorable arrangement of the hot-melt binder and temperature-sensitive thickener in the area A of the negative electrode active material layer, it is preferably to heat, for instance, at 60° C. to 180° C. (preferably 65° C. to 150° C., more preferably 70° C. to 120° C., typically 75° C. to 100° C. The drying time is not particularly limited. When drying at or above 100° C., it is preferably about 10 sec to 100 sec (e.g. 20 sec to 80 sec). When drying below 100° C., the drying time is preferably about 30 sec to 300 sec (e.g. 60 sec to 240 sec). This is thought to increase the tendency toward favorable arrangement of the hot-melt binder and temperature-sensitive thickener in the area A. When using, as the temperature-sensitive thickener, a gelling agent that undergoes irreversible gelation when heated to a certain temperature, it is preferable to set the drying temperature below 100° C. (e.g. below 80° C., typically at or below 75° C.).

By pressing before and after the drying process, a negative electrode active material layer having an area A formed of composition A and an area B formed of composition B can be formed, whereby a negative electrode comprising the negative electrode active material layer can be obtained. It is noted that what is being fabricated in FIG. 7 is a sheet 40' to be divided later into two separate negative electrode sheets. After the negative electrode active material layer is formed, the sheet 40' is cut at the center to yield two separate negative electrode sheets 40. Obviously, the method for fabricating the negative electrode is not limited to this.

The coating weight of negative electrode active material layer (non-volatile-based coating amount of negative electrode active material layer-forming composition) per unit surface area of negative current collector is not particularly limited. From the standpoint of obtaining sufficient conductive paths (conducting paths), it is preferably 2 mg/cm² or greater (e.g. 3 mg/cm² or greater, typically 4 mg/cm² or greater), but 40 mg/cm² or less (e.g. 22 mg/cm² or less, typically 16 mg/cm² or less) per face of negative current collector. The negative electrode active material layer preferably has a thickness per face of negative current collector of 20 µm or larger (e.g. 40 µm or larger, typically 60 µm or larger), but 100 µm or smaller (e.g. 80 µm or smaller, typically 70 µm or smaller).

The separator (separator sheet) placed to separate the positive electrode and negative electrode can be a material that insulates the positive electrode active material layer and negative electrode active material layer while allowing the transport of the electrolyte. A preferable example of separator is constituted with a porous polyolefin-based resin. For instance, can be preferably used an about 5 μm to 30 μm thick porous separator sheet formed of a synthetic resin (e.g. polyethylene (PE), polypropylene (PP), or an polyolefin having a constitution combining two or more layers of these). The separator sheet may be provided with a heat-resistant layer as well. When the liquid electrolyte is substituted with a solid (gel) electrolyte formed by adding a polymer to the electrolyte, the electrolyte itself may serve as a separator and another separator may not be required.

The non-aqueous electrolyte injected into the lithium secondary battery may comprise at least a non-aqueous solvent and a supporting salt. A typical example is an electrolyte solution having a composition comprising a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc. Fluorinated carbonates such as monofluoroethylene carbonate (MFEC) and difluoroethylene carbonate (DFEC) can be preferably used as well. These can be used solely as one species or as a mixture of two or more species. In particular, a solvent mixture of EC, DMC and EMC is preferable.

As the supporting salt, for example, can be used one, two or more species of lithium compounds (lithium salts) such as $LiPF_6$, $LiBF_4$, $LiC_{104}$, $LiAsFG$, $LiCF_3SO_3$, $LiC_4F_9SO_3$, $LiN(CF_3SO_2)_2$, $LiC(CF_3SO_2)_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte may comprise optional additives as necessary to an extent not significantly impairing the objectives of the present invention. The additive may be used so as to increase the battery's output performance, to increase the shelf life (to inhibit a capacity decrease during storage, etc.), to bring about greater cycle characteristics, to increase the initial charging and discharging efficiencies, and so on. Examples of preferable additives include a fluorophosphate (preferably a difluorophosphate, e.g. lithium difluorophosphate represented by $LiPO_2F_2$) and lithium bis (oxalato)borate (LiBOB). Alternatively, for instance, can be used additives such as cyclohexylbenzene, biphenyl and the like which are applicable in dealing with overcharges.

The art disclosed herein can be preferably applied to a relatively high capacity lithium secondary battery having a battery capacity of 20 Ah or higher. Examples include a lithium secondary battery having a battery capacity of 20 Ah or higher (typically 22 Ah or higher, e.g. 25 Ah or higher) up to 100 Ah. In such a high capacity-type lithium secondary battery, a large surface area of the negative electrode active material layer does not face the positive electrode active material layer, and thus, more Li ions are likely to be irreversibly fixed. By applying the constitution of the present invention to such a large-capacity battery, while increasing or retaining battery properties such as cycle characteristics, etc., capacity degradation can be preferably inhibited during high-temperature storage.

As described above, for the lithium secondary battery in the art disclosed herein, battery properties including cycle characteristics can be increased or retained, and further, capacity degradation during high-temperature storage is inhibited. Accordingly, it can be used as a secondary battery for various purposes. For example, as shown in FIG. 8, a lithium secondary battery 100 can be installed in a vehicle 1 such as an automobile, etc., and preferably used as a power supply for a drive source such as a motor and the like to drive the vehicle 1. Accordingly, the present invention can provide a vehicle (typically an automobile, particularly an automobile comprising an electric motor such as a hybrid vehicle (HV), plug-in hybrid vehicle (PHV), electric vehicle (EV) and fuel cell vehicle) 1 comprising, as its power source, the lithium secondary battery (typically a battery system comprising several series-connected batteries) 100.

Several worked examples relating to the present invention are described below, but the present invention is not intended to be limited to these examples. In the description below, "parts" and "%" are by mass unless otherwise specified.

Example 1

[Fabrication of Positive Electrode Sheet]

With NMP, were mixed a powdered lithium nickel manganese cobalt oxide ($Li[Ni_{1/3}Mn_{1/3}Co_{1/3}]O_2$) as a positive electrode active material, acetylene black as a conductive material and PVdF as a binder at a mass ratio of these materials of 100:5:3 to prepare a paste-like positive electrode active material layer-forming composition. The composition was evenly applied to each face of a long sheet of aluminum foil (15 μm thick). Subsequently, the composition was dried (blow-dried with hot air) at a temperature of 120° C. for 20 seconds, pressed and then cut to fabricate a sheet of positive electrode (positive electrode sheet) measuring 4500 mm in length and 170 μm in overall thickness. In the positive electrode sheet, each positive electrode active material layer measured 94 mm in width.

[Fabrication of Negative Electrode Sheet]

With ion-exchanged water, were mixed a powdered graphite as a negative electrode active material, curdlan (gelation temperature: about 50° C.) as a temperature-sensitive thickener, CMC as a thickener and a hot-melt binder (trade name "CHEMIPEARL 5650" available from Mitsui Chemicals, Inc., ionomer resin particles of ethylene-methacrylic acid copolymer) at a mass ratio of these materials of 100:0.5:0.5:1 to prepare a paste-like area A-forming composition (composition A1). In addition, with ion-exchanged water, were mixed a powdered graphite as a negative electrode active material, CMC as a thickener and SBR as a binder at a mass ratio of these materials of 100:1:1 to prepare a paste-like area B-forming composition (composition B). These compositions A1 and B were evenly applied to each face of copper foil (14 μm thick). More specifically, using a fabrication apparatus having a die coater 70 shown in FIG. 7, the compositions A1 and B were applied to non-positive-electrode-facing portion $A_{NF}$ and positive-electrode-facing portions $A_F$ of the copper foil (negative current collector 42), respectively. Subsequently, the composition was dried (blow-dried with hot air) at a temperature of 70° C. for 180 seconds and then pressed to fabricate a sheet of negative electrode (negative electrode sheet) measuring 4700 mm in length and 150 μm in overall thickness. Each negative electrode active material layer measured 100 mm in width.

23

[Fabrication of Lithium Secondary Battery]

The resulting positive electrode sheet and negative electrode sheet along with separators in-between were elliptically wound to prepare a wound electrode body. As the separator, was used a long sheet of three-layer film (20 μm thick) formed of PP/PE/PP. The wound electrode body had the constitution schematically illustrated in FIG. 3 to FIG. 5. The distance W from the end of area A closer to the center in the width direction of the negative electrode sheet to the boundary between the positive-electrode-facing portion and non-positive-electrode-facing portion was 1 mm. To positive and negative current collector ends in the wound electrode body, electrode terminals were connected, respectively. The resultant was placed in an aluminum battery case. Subsequently, a non-aqueous electrolyte solution was injected and the opening was sealed to fabricate a square lithium secondary battery having a rated capacity of 24.0 Ah. As the non-aqueous electrolyte solution, was used an electrolyte solution containing about 1 mol/L of $LiPF_6$ as a supporting salt dissolved in a mixed solvent of EC, DMC and EMC at 3:4:3 (volume ratio). 125 g of the non-aqueous electrolyte solution was injected.

Examples 2, 3

Except that the distance W was 2 mm, in the same manner as Example 1, a lithium secondary battery according to Example 2 was fabricated. Except that the distance W was 3 mm, in the same manner as Example 1, a lithium secondary battery according to Example 3 was fabricated.

Example 4

With ion-exchanged water, were mixed a powdered graphite as a negative electrode active material, curdlan as a temperature-sensitive thickener, CMC as a thickener and SBR as a binder at a mass ratio of these materials of 100:0.5:0.5:1 to prepare a paste-like area A-forming composition (composition A2). Except that the composition A2 was used as the area A-forming composition, in the same manner as Example 1, a lithium secondary battery according to Example 4 was fabricated.

Examples 5, 6

Except that the distance W was 2 mm, in the same manner as Example 4, a lithium secondary battery according to Example 5 was fabricated. Except that the distance W was 3 mm, in the same manner as Example 4, a lithium secondary battery according to Example 6 was fabricated.

Example 7

With ion-exchanged water, were mixed a powdered graphite as a negative electrode active material, CMC as a thickener and the aforementioned hot-melt binder at a mass ratio of these materials of 100:1:1 to prepare a paste-like area A-forming composition (composition A3). Except that the composition A3 was used as the area A-forming composition, in the same manner as Example 1, a lithium secondary battery according to Example 7 was fabricated.

Examples 8, 9

Except that the distance W was 2 mm, in the same manner as Example 7, a lithium secondary battery according to Example 8 was fabricated. Except that the distance W was 3 mm, in the same manner as Example 7, a lithium secondary battery according to Example 9 was fabricated.

Example 10

The composition B used in Example 1 was used as the area A-forming composition and area B-forming composition. Otherwise in the same manner as Example 1, a lithium secondary battery according to Example 10 was fabricated. The negative electrode active material layers in this secondary battery formed of only the composition B.

[50° C. Cycle Capacity Retention Rate]

In an environment at a temperature of 25° C., each battery was subjected to charging at 1 C to 4.1 V followed by a 5 minute break followed by discharging at 1 C to 3.0 V followed by a 5 minute break. Subsequently, the battery was subjected to constant-current constant-voltage (CCCV) charging at 1 C to 4.1 V with a 0.1 C cut-off followed by CCCV discharging at 1 C to 3.0 V with a 0.1 C cut-off. The discharge capacity during this operation was measured and recorded as the initial capacity. After the initial capacity was measured, in a thermostatic chamber at 50° C., the battery was subjected to 1000 cycles of CC charging and discharging at 2 C, and the discharge capacity after 1000 cycles was measured. The capacity retention rate (%) was determined by the equation:

Capacity retention rate (%)=discharge capacity after 1000 cycles/initial capacity×100

For each example, 5 batteries were obtained. The capacity retention rates of the respective batteries were measured and their average value was recorded. The results are shown in Table 1.

[IV Resistance]

In an environment at a temperature of 25° C., each battery was charged and adjusted to 60% SOC (state of charge). Subsequently, at 25° C., the battery was subjected to a 10 second pulse discharging at a 10 C current. The IV resistance (mo) was determined from the voltage drop at 10 seconds from the start of discharge. For each example, 10 batteries were obtained. The IV resistance values of the respective batteries were measured and their average value was recorded. The results are shown in Table 1.

[0° C. Pulse-Cycle Capacity Retention Rate]

In an environment at a temperature of 25° C., each lithium secondary battery obtained was conditioned and subjected to CC discharging to 3.0 V followed by CCCV charging to 50% SOC. The lithium secondary battery in this state was subjected to a discharge capacity measurement. At 25° C., the battery was subjected to CC discharging at 1 C from 4.1 V to 3.0 V followed by CV discharging to a total discharging time of 2 hours; and the integrated capacity value measured during this operation was used as the discharge capacity. The result was used as the initial capacity.

With respect to the 0° C. pulse capacity retention rate test, in an environment at 0° C., each lithium secondary battery adjusted to 50% SOC was subjected to 50000 cycles of pulse charging and discharging, with one cycle consisting of the following charging and discharging pattern:

(1) Charging (CC charging) at a constant current of 20 C for 10 seconds
(2) 10 minute break
(3) Discharging (CC discharging) at a constant current of 20 C for 10 seconds
(4) 10 minute break After the test, discharge capacity was measured under the same conditions as the initial capacity. The results were used as the post-pulse capacities. The values obtained were substituted into the following equation to determine the pulse cycle capacity retention rate:

$$0° C.\text{ pulse cycle capacity retention rate (\%)} = (\text{post-pulse capacity})/(\text{initial capacity}) \times 100$$

The results are shown in Table 1.

[60° C. Post-Storage Capacity Retention Rate]

The initial capacity and discharge capacity were measured by the method described below and the 60° C. post-storage capacity retention rate was determined by the equation:

$$60° C.\text{ post-storage capacity retention rate (\%)} = (\text{post-storage capacity})/(\text{initial capacity}) \times 100$$

The initial capacity was measured by the following method. At a temperature of 25° C., each lithium secondary battery adjusted to a prescribed SOC was subjected to CC charging at 1 C to 4.1 V followed by CV charging to a total charging time of 2.5 hours (CCCV charging). After a 10 minute break from the completion of the charging, each battery was then subjected to CC discharging at 0.33 C (⅓ C) from 4.1 V to 3.0 V followed by CV discharging to a total discharging time of 4 hours. The discharge capacity during this operation was measured and used as the initial capacity.

After the lithium secondary battery adjusted at a temperature of 25° C. to 100% SOC was stored in an environment at 60° C. for 100 days, the post-storage capacity was measured under the same conditions as the initial capacity. For each example, 50 lithium secondary batteries were obtained and subjected to the same measurements and the average value of the obtained values was recorded. The results are shown in Table 1.

TABLE 1

| | 50° C. cycle capacity retention rate (%) | IV resistance (mΩ) | 0° C. pulse cycle capacity retention rate (%) | 60° C. post-storage capacity retention rate (%) |
|---|---|---|---|---|
| Ex. 1 | 90.1 | 3.1 | 79.2 | 97.4 |
| Ex. 2 | 89.5 | 3.1 | 79.1 | 97.5 |
| Ex. 3 | 89.4 | 3.1 | 79.0 | 97.9 |
| Ex. 4 | 84.1 | 3.1 | 79.0 | 97.2 |
| Ex. 5 | 83.1 | 3.1 | 78.9 | 97.3 |
| Ex. 6 | 82.2 | 3.2 | 78.9 | 97.4 |
| Ex. 7 | 88.9 | 3.3 | 63.2 | 88.1 |
| Ex. 8 | 88.1 | 3.4 | 62.7 | 88.0 |
| Ex. 9 | 87.6 | 3.5 | 61.8 | 88.1 |
| Ex. 10 | 87.9 | 3.1 | 79.1 | 79.2 |

As shown in Table 1, with respect to the lithium secondary batteries according to Examples 1 to 3 including a hot-melt binder and a temperature-sensitive thickener in the non-positive-electrode-facing portions of the negative electrode active material layers, the capacity retention rates after storage at 60° C. were all at least 97.4%. They showed excellent results in the 50° C. cycle capacity retention rate, IV resistance, and 0° C. pulse cycle capacity retention rate as well. With respect to the secondary batteries according to Examples 4 to 6 using a temperature-sensitive thickener without the use of a hot-melt binder, good results were obtained in terms of the 60° C. post-storage capacity retention rate and 0° C. pulse cycle capacity retention rate. Their 50° C. cycle capacity retention rates were lower than those of Examples 1 to 3. With respect to the secondary batteries according to Examples 7 to 9 using a hot-melt binder without the use of a temperature-sensitive thickener, good results were obtained in terms of the 50° C. cycle capacity retention rate. Their IV resistance values, 0° C. pulse cycle capacity retention rates and 60° C. post-storage capacity retention rates fell short of those of Examples 1 to 3. On the contrary, with respect to the secondary battery of Example 10 using neither a hot-melt binder nor a temperature-sensitive thickener, decreases were observed for the properties (50° C. cycle capacity retention rate, 0° C. pulse cycle capacity retention rate, 60° C. post-storage capacity retention rate) except for the battery resistance.

With regard to the 60° C. post-storage capacity retention rate, Examples 4 to 6 using a temperature-sensitive thickener and Examples 7 to 9 using a hot-melt binder showed superior results when compared to Example 10 using neither a hot-melt binder nor a temperature-sensitive thickener. This indicates that a hot-melt binder and a temperature-sensitive thickener can independently inhibit capacity degradation during high-temperature storage. On the other hand, in Example 10 using neither a hot-melt binder nor a temperature-sensitive thickener, presumably, the transport of Li ions was not inhibited during high-temperature storage, causing irreversible Li ion fixation on the negative electrode active material layer surface resulting in the decreased capacity retention rate upon high-temperature storage. The inhibition of capacity degradation during high-temperature storage was achieved primarily by the inclusion of a temperature-sensitive thickener. However, in Examples 1 to 3 combining a hot-melt binder and a temperature-sensitive thickener, capacity degradation was further inhibited during high-temperature storage as compared to Examples 4 to 9 using either a temperature-sensitive thickener or a hot-melt binder. This indicates the presence of the effect of the combined use of a hot-melt binder and a temperature-sensitive thickener. This may be because the effect of a hot-melt binder and the effect of a temperature-sensitive thickener are not counteractive. Presumably, by the combined use of the hot-melt binder and temperature-sensitive thickener, the two were arranged in the negative electrode active material layer preferably from the standpoint of inhibiting capacity degradation during high-temperature storage, resulting in yet greater inhibition of capacity degradation.

With regard to the 50° C. cycle capacity retention rate, from comparison among Examples 4 to 6 and Examples 7 to 9, it is found that the presence of a hot-melt binder greatly affect the result. One mechanism for this can be, for instance, that during formation of a negative electrode active material layer, the hot-melt binder melts down once and then solidify again to tighten the binding among negative electrode active material particles as well as the binding between the negative electrode active material layer and negative current collector further than when a non-hot-melt rubber-based binder is used. Presumably, as a result, desorption of the negative electrode active material and peeling of the negative electrode active material layer from the negative current collector are inhibited, contributing to the increase in high-temperature cycle characteristics. In particular, since the area A including a hot-melt binder is present in an end of the negative electrode active material layer, the area is relatively more susceptible to desorption of the negative electrode active material and peeling of the negative electrode active material layer from the negative current collector. By the tighter binding among negative electrode active material particles and between the negative electrode active material layer and negative current collector, the 50° C. cycle capacity retention rate is presumed to have significantly increased. The effect increased further in Examples 1 to 3 using a temperature-sensitive thickener in combination. A mechanism for this would be that by the combined use of the hot-melt binder and temperature-sensitive thickener, the hot-melt binder was arranged in the negative electrode active material layer preferably from the standpoint of obtaining tighter binding among negative electrode active material particles and between the negative electrode active material layer and negative current collector.

In Examples 7 to 9 using a hot-melt binder without the use of a temperature-sensitive thickener, there was found a tendency toward a decrease in IV resistance as well as a decrease in 0° C. pulse cycle capacity retention rate. It can be thought that in the absence of a temperature-sensitive thickener, the tendency for the hot-melt binder to coat the negative electrode active material (i.e. the surface coverage of negative electrode active material with the hot-melt binder) increases and the hot-melt binder inhibits the transport of Li ions during charging and discharging, bringing about the decreases of the properties. In Examples 7 to 9, degradation of low-temperature cycle characteristics was particularly notable. In this particular measurement test, the presence of Li precipitate was also found at the edges of the negative electrode active material layer. It is presumed that the absence of a temperature-sensitive thickener increased the tendency toward localization of the hot-melt binder to the surface layer in the negative electrode active material layer, thereby decreasing the Li ion absorption and forcing the unabsorbed Li ions to precipitate out.

In conclusion, it is shown that the combined use of a hot-melt binder and a temperature-sensitive thickener can effectively inhibit capacity degradation during high-temperature storage. It is also shown that in addition to the combined use, by the inclusion of the hot-melt binder and temperature-sensitive thickener limited to a non-positive-electrode-facing portion, it is possible to retain high levels of charging and discharging properties over the low to high temperature range or even bring about increases of these properties. With this constitution, the occurrence of an increase in battery resistance can be sufficiently inhibited as well. In summary, according to the constitution described above, a lithium secondary battery can be made to be high-powered and highly durable over a wide range of temperature from low to high temperatures.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST 1 automobile (vehicle)
10 battery case
12 opening
14 lid
20 wound electrode body
25 non-aqueous electrolyte (non-aqueous electrolyte solution)
30 positive electrode (positive electrode sheet)
32 positive current collector
34 positive electrode active material layer
35 positive current collector-overlapping portion
36 positive electrode active material layer-free portion
37 inner positive terminal
38 outer positive terminal
40 negative electrode (negative electrode sheet)
42 negative current collector
44 negative electrode active material layer
45 negative current collector-overlapping portion
46 negative electrode active material layer-free portion
47 inner negative terminal
48 outer negative terminal
50A, 50B separators (separator sheets)
100 lithium secondary battery

The invention claimed is:

1. A lithium secondary battery comprising:
a positive electrode comprising a positive electrode active material layer; and
a negative electrode comprising a negative electrode active material layer,
wherein
the positive electrode active material layer and the negative electrode active material layer are placed to face each other,
the negative electrode active material layer has areas A and B, the area A comprising a non-positive-electrode-facing portion that does not face the positive electrode active material layer, the area B comprising a positive-electrode-facing portion that faces the positive electrode active material,
the area A comprises a negative electrode active material, a hot-melt binder and a temperature-sensitive thickener,
the area B does not include the hot-melt binder and does not include the temperature-sensitive thickener, and
the hot-melt binder has a melting point and the temperature-sensitive thickener has a gelation temperature both in a range of 45° C. to 100° C.

2. The lithium secondary battery according to claim 1, wherein when the melting point of the hot-melt binder is X ° C. and the gelation temperature of the temperature-sensitive thickener is Y ° C., the melting point X ° C. of the hot-melt binder and the gelation temperature Y ° C. of the temperature-sensitive thickener satisfy a relationship $|X-Y| \leq 30$.

3. The lithium secondary battery according to claim 1, wherein when the melting point of the hot-melt binder is X ° C. and the gelation temperature of the temperature-sensitive thickener is Y ° C., the melting point X ° C. of the hot-melt binder and the gelation temperature Y ° C. of the temperature-sensitive thickener satisfy a relationship $X \geq Y$.

4. The lithium secondary battery according to claim 1, wherein the melting point of the hot-melt binder is 70° C. to 90° C.

5. The lithium secondary battery according to claim 1, wherein the temperature-sensitive thickener is a polysaccharide.

6. The lithium secondary battery according to claim 1, wherein the temperature-sensitive thickener is a curdlan.

7. The lithium secondary battery according to claim 1, wherein the hot-melt binder has an average particle diameter smaller than 0.1 µm.

8. The lithium secondary battery according to claim 1, wherein the hot-melt binder has a density of 1.2 g/cm$^3$ or smaller.

9. A vehicle comprising the lithium secondary battery according to claim 1.

10. The lithium secondary battery according to claim 1, wherein the area A is formed so as to extend beyond the boundary between the positive-electrode-facing portion and the non-positive-electrode-facing portion by a distance W to the positive-electrode-facing portion side, the distance W being larger than 0 mm.

11. The lithium secondary battery according to claim 1, wherein a volume ratio of the area A to the area B (A:B) is 0.5:99.5 to 20:80.

12. The lithium secondary battery according to claim 1, wherein the hot-melt binder has a density of 0.5 to 1.0 g/cm$^3$.

13. The lithium secondary battery according to claim 1, wherein the hot-melt binder is selected from polyolefins and acrylic polymers, and the hot-melt binder has a density of 1.2 g/cm$^3$ or smaller.

14. The lithium secondary battery according to claim 1, wherein a mass ratio of the hot-melt binder to the temperature-sensitive thickener is 9:1 to 1:9 in the area A of the negative electrode active material layer.

* * * * *